(12) United States Patent
Andrews

(10) Patent No.: US 7,380,367 B1
(45) Date of Patent: Jun. 3, 2008

(54) SNELLED FLY FILE

(76) Inventor: James S. Andrews, 20812 Vista Grande Dr., Austin, CO (US) 81410

( * ) Notice: Subject to any disclaimer, the term of this patent is extended or adjusted under 35 U.S.C. 154(b) by 0 days.

(21) Appl. No.: 11/297,758

(22) Filed: Dec. 8, 2005

(51) Int. Cl.
*A01K 97/06* (2006.01)

(52) U.S. Cl. .................................................... 43/57.1

(58) Field of Classification Search ............... 43/57.1, 43/54.1; 206/315.11
See application file for complete search history.

(56) References Cited

U.S. PATENT DOCUMENTS

| | | | |
|---|---|---|---|
| 502,427 A | 8/1893 | Zangenberg | |
| 657,786 A | 9/1900 | Plumley | |
| 674,984 A | 5/1901 | Plumley | |
| 4,577,433 A | * | 3/1986 | Jones .......................... 43/57.2 |
| 5,157,862 A | 10/1992 | Companiony | |
| 5,632,113 A | * | 5/1997 | Raymond et al. ............ 43/54.1 |
| 6,516,555 B2 | 2/2003 | Buzzell | |
| 2005/0044774 A1 | * | 3/2005 | Shannon ...................... 43/54.1 |

* cited by examiner

*Primary Examiner*—Kurt Rowan
(74) *Attorney, Agent, or Firm*—Crossley Patent Law; Mark A. Crossley

(57) ABSTRACT

A snelled fly file for a fisherman to carry on their person is described. The file provides a fisherman instant identifiable and organized access to a snelled fly collection, thereby offering convenience and easily visible, instant selection. The two covers hold see-through bags of snelled flies within, each with identification cards whereby two flies can be held within each bag. The lanyard is preferably worn around the fisherman's neck, with instant open access to the flies within. The bags are removably contained between the two covers thereby allowing for the exchange of any bags of flies. This give a fisherman the ability to organize and retrieve his snelled flies as the fishing conditions may warrant.

6 Claims, 4 Drawing Sheets

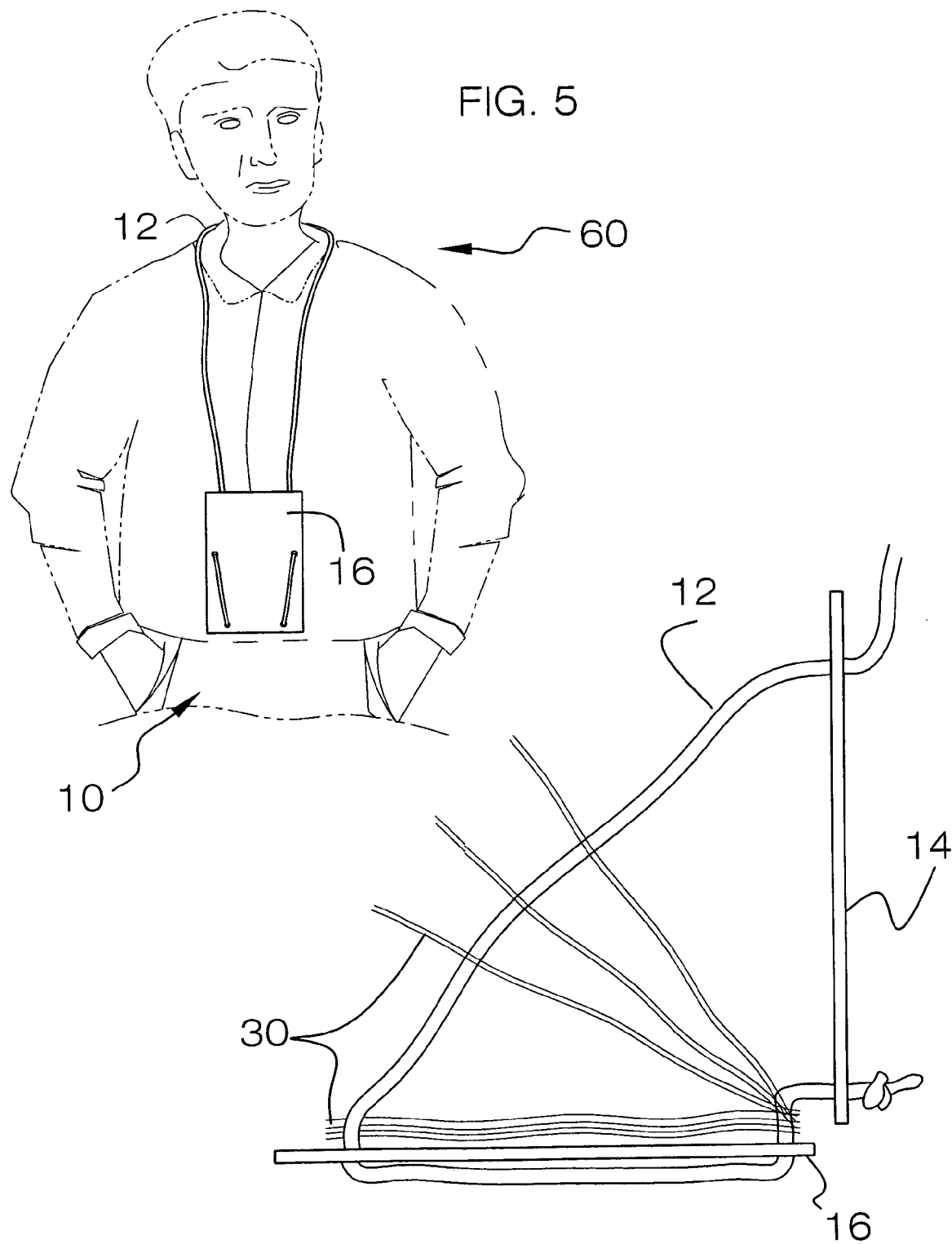

SNELLED FLY FILE

BACKGROUND OF THE INVENTION

Fly fishing is an art which typically requires a wide variety of flies with which to attract a fish. Fly fishermen spend a considerable amount of time and effort in choosing, attaching, and removing flies in efforts to entice fish. The convenient storage and access to fishing flies has challenged fishermen since even before modern times. Various devices have been offered to assist fly fishermen in storing and organizing fishing flies. Fishermen have used their hats, tackle boxes, vests, and assorted other boxes and contraptions in efforts to improve fly access and changes. The advantages afforded by immediate access to flies are well known. These advantages include not only time savings, but lessened movement around and through waters within which the fish lurk.

Snelled flies can further improve efforts at fly fishing and convenience. Snelled flies are well known in the art of fly fishing. A snelled fly is a fly fitted with a relatively short length of leader. The leader is affixed to the fly on one end, with a loop on the opposite end. Various devices have been purveyed which offer organizational access to snelled flies. Keeping snelled flies organized, labeled, untangled, easily accessed, and immediately handy are challenges not previously successfully met. The present invention offers a unique apparatus for organizing, separating, and storing flies. The present invention also enables the fishermen to carry the flies upon his person and in a position immediately accessible both physically and visually, without hampering fishing in any way.

FIELD OF THE INVENTION

The present invention relates to holders for snelled flies for fishermen.

SUMMARY OF THE INVENTION

The general purpose of the snelled fly file, described subsequently in greater detail, is to provide a snelled fly file which has many novel features that result in an improved snelled fly file which is not anticipated, rendered obvious, suggested, or even implied by prior art, either alone or in combination thereof.

The present invention provides a convenient means for carrying a large quantity of snelled flies allowing for the convenience of using a loop to loop knot to affix the fly to the fly line leader. This is of particular value to a fisherman with impaired vision since it is very difficult to thread the fly line leader through the eye of the fly. A loop to loop knot is extremely attractive to virtually all fly fisherman.

To accomplish this, the snelled fly file is comprised of an apparatus which enables the fly fisherman to carry the fly file around his/her neck. For explanation's sake, the fly fishing man or woman is referred to as the fly fisherman. The preferred example provides a lanyard for supporting my snelled fly file around the neck of the fisherman. The lanyard length is adjustable via more than one means. The file's position on the user's chest may be adjusted by shortening or lengthening the lanyard. The lanyard length may be adjusted by merely tying a knot on one end of the lanyard. Also, adjustment may be accomplished by simply tying the lanyard's overall length with a knot or by the use of various cord devices, buckles, what are known as cord locks, and the like which easily shorten and lengthen a cord, which is referred to herein as the lanyard. The lanyard's length can also be adjusted by knots which are at the ends of the lanyard adjacent to the inside cover of the invention. The lanyard holds two relatively rigid covers, the inside cover and the outside cover. The covers therefore hang from a user's neck and are adjustably positioned for greatest convenience to a particular user by simply adjusting the lanyard overall length. The covers are thereby held anywhere along the front torso as desired. Bags are positioned between the covers. The bags are see-through and typically plastic, as are well known. The bags are resealable to enable moisture proof storage of the snelled flies. Ideally, identification cards within each bag enable quick identification of each fly within. In addition, as each bag may hold one or two identification cards, one for viewing from each side of the see-through bag, two flies can be fitted within each bag and held separately therein.

The two covers are equipped with orifices through which the lanyard passes. Upper orifices are ideally spread toward the outer upper edges of the covers. Lower orifices are ideally closer together and disposed proximal to the bottom edges of the covers. The bags are sized smaller than the covers, whereby the bags' protection and support are assured. Additionally, in one example, the permanently sealed ends of the bags are equipped with holes. The lanyard passes through the upper orifices of the inside cover, then through the upper orifices of the outside cover. The lanyard then passes through the lower orifices of the outside cover, through the bag holes, then through the lower orifices of the inside cover. The two ends of the lanyard are then knotted or appropriately fastened to not slip out. The bag holes are hermetically sealed to keep the collected bags from separating and to increase the strength of the bag connection. In use in choosing a snelled fly, the outside cover is pulled out and temporarily disposed in a plane as desired, a horizontal plane for example. The upper orifices are sized such that the friction of the lanyard within the orifices holds the outside cover in place as desired. Bags are then exposed and can be leafed through to choose a selected snelled fly. The bags are resealable at the ends opposite their holes. A simple tug returns the outside cover to the fully closed position or other angle relative to the inside cover.

In yet other examples of the invention, various forms of clamps are provided to hold the bags between the covers, whereby there are no holes in the bags.

By affording a basic knot or above mentioned lanyard securing devices, the covers of the invention can be easily separated for the addition or subtraction of bags held within. Bags are offered individually or in sets which contain a plurality of bags. User desired fly organization is also provided by the same advantageous feature. Further, the addition of dividers between bags or groups of bags can further assist a fisherman in identification and organization of flies. A more complete version of the invention offers a spring clip on at least one cover to book mark a bag choice. A further modification includes spaced apart lugs on at least one cover whereby coiling snelled flies is facilitated. The most complete example offers lugs on both covers. Small clips, of various designs may also employed to clasp a coiled snelled fly once it is coiled around the lugs. A snelled fly in a coiled condition, with or with out using an external clip, are easily inserted and contained within the bag. The covers, especially the outside cover, offer means for advertising, logos, and the like.

The basic nature of the invention provides for extremely inexpensive manufacture and subsequent sale, without undue complexity, castings, forgings or any specific materials often used in other devices in the art. The covers are easily made of any of a variety of materials. And, the covers may be manufactured identically, thereby further saving expense. The preferred materials do not rust, thereby providing lifelong use. The lanyard is easily replaced as needed also.

The bags can be specifically made, if needed, but the preferred example of the invention uses inexpensive commercially available bags. As snelled flies are coiled, there is no restriction upon snell length.

The wearing positions of the file afford uninterrupted mobility and fishing. The design of the fly file is even more useful to anyone who is visually impaired in any way.

The design of my snelled fly file is such that anyone who fly fishes is capable of assembling the device. This allows for my invention to be sold as a kit and thereby reducing the cost to the fisherman by avoiding much of the costs associated with assembly.

Another objective of my invention is to allow for the use of non-metallic construction components. This will avoid the problems associated with corrosion. This feature will make my invention ideal for the fisherman who practices the sport in salt waters.

Still a further object is to provide a snelled fly file that provides the fisherman with the capabilities of carrying streamside a large number of snelled flies in a lightweight and compact package.

Thus has been broadly outlined the more important features of the snelled fly file so that the detailed description thereof that follows may be better understood and in order that the present contribution to the art may be better appreciated.

Numerous objects, features and advantages of the snelled fly file will be readily apparent to those of ordinary skill in the art upon reading the following detailed description of presently preferred, but nonetheless illustrative, examples of the snelled fly file when taken in conjunction with the accompanying drawings. In this respect, before explaining the current examples of the snelled fly file in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the snelled fly file. It is therefore important that the claims be regarded as including such equivalent constructions insofar as they do not depart from the spirit and scope of the present invention.

Objects of the snelled fly file, along with various novel features that characterize the invention are particularly pointed out in the claims forming a part of this disclosure. For better understanding of the snelled fly file, its operating advantages and specific objects attained by its uses, refer to the accompanying drawings and description.

BRIEF DESCRIPTION OF THE DRAWINGS

FIG. 5 is a frontal view of the invention worn by a user.

FIG. 6 is a perspective view of the invention with the outside cover folded downwardly, offering the fisherman the choice of fly bag selection.

DETAILED DESCRIPTION OF THE DRAWINGS

With reference now to the drawings, and in particular FIGS. 1 through 7 thereof, example of the snelled fly file employing the principles and concepts of the present invention and generally designated by the reference number 10 will be described.

Figure 7:
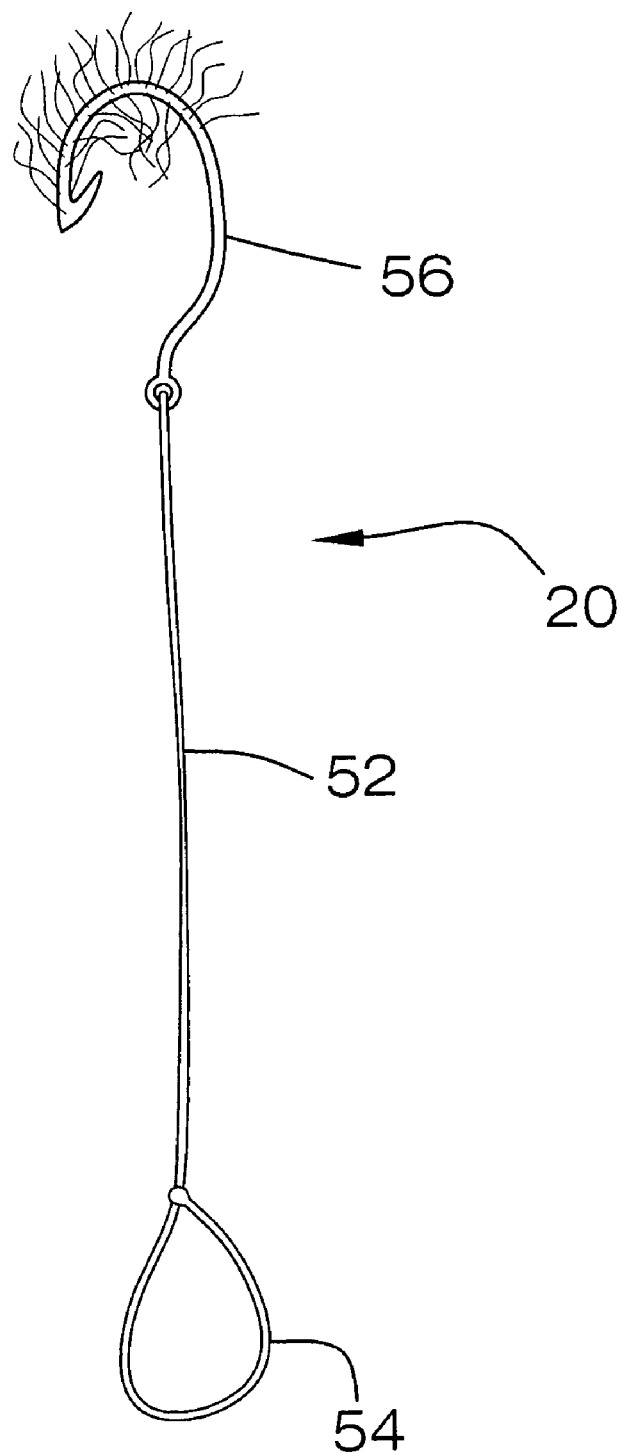
FIG. 7 is a typical snelled fly.

Referring to FIG. 7, a typical snelled fly 50 is comprised of a fly with hook 56. The snell 52 fastens to the fly with hook 56 on one end and has a loop 54 on the opposite end of the snell 52.

Figure 1:
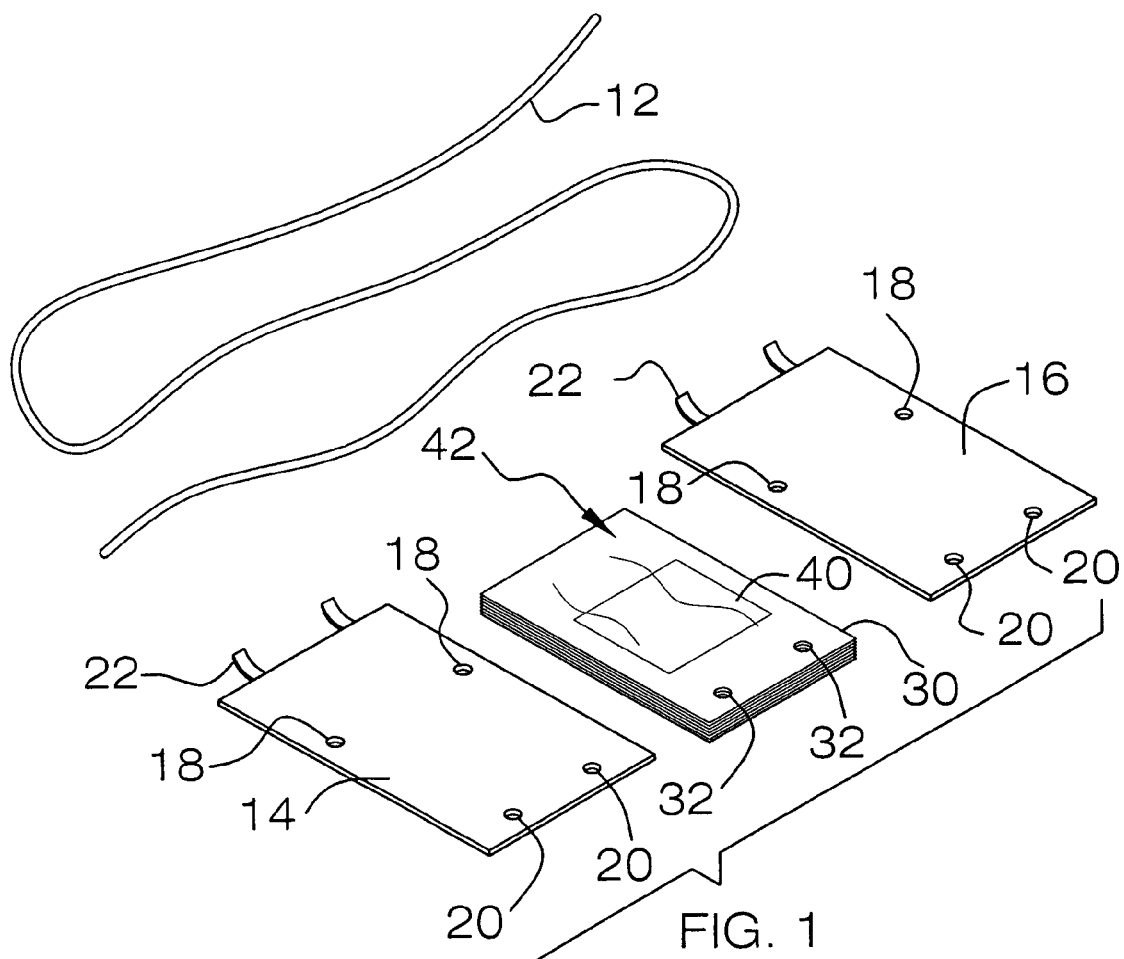
FIG. 1 is a view of the disassembled components of the invention.
Figure 2:
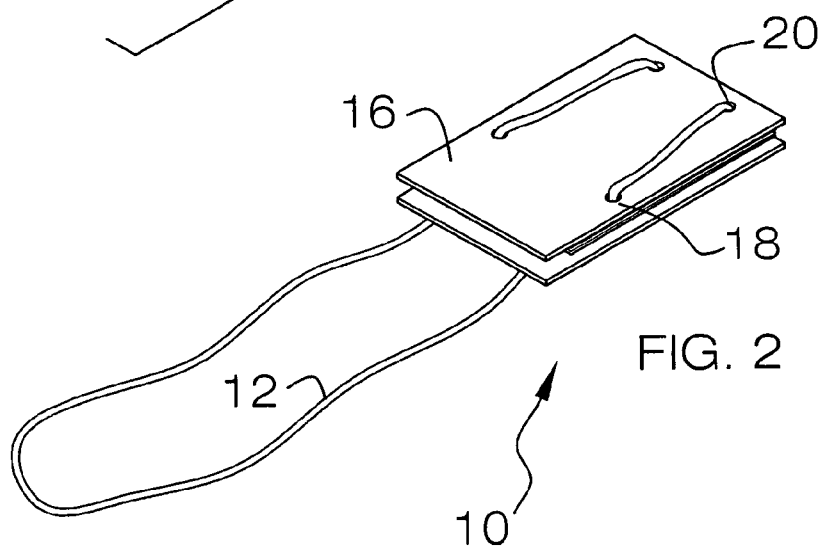
FIG. 2 is a perspective view of the assembled invention, showing the outside cover foremost.
Figure 3:
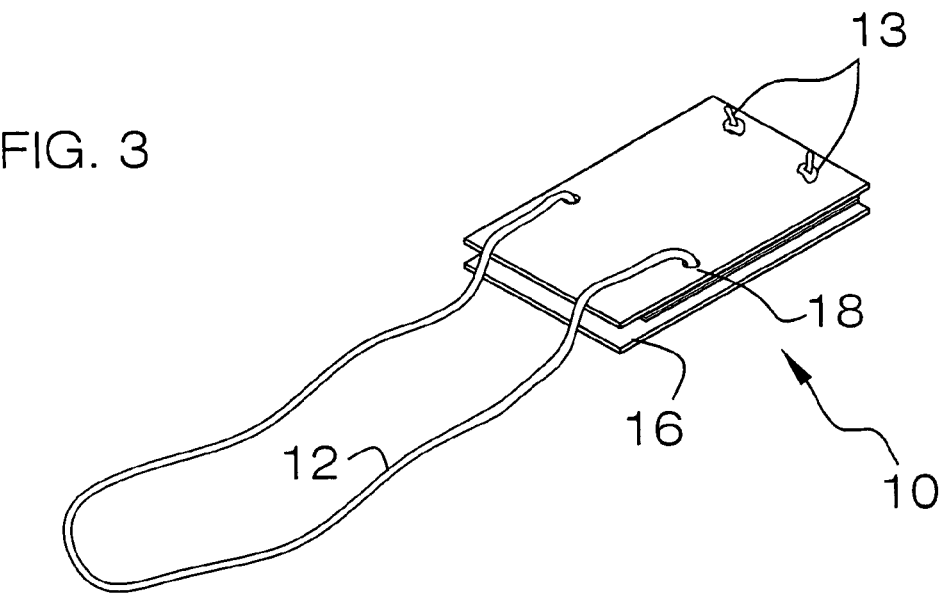
FIG. 3 is a perspective view of the invention showing the inside cover foremost.

Referring to FIGS. 1, 2, and 3, the invention 10 comprises a lanyard 12, an inside cover 14, and outside cover 16 and a plurality of bags forming a bag assembly 30. Covers 12 and 16 are identical in shape and configuration. The preferred example of the invention 10 provides spaced apart lugs 22 on the inside cover 14 and two spaced apart lugs 22 on the outside cover 16. The lugs 22 aid in coiling a snelled fly for neat insertion into a bag assembly 30. The parallelepiped inside cover 14 has a top and a bottom, an inner side and an outer side. The parallelepiped outside cover 16 has a top and a bottom, an inner side and an outer side. A pair of spaced apart upper orifices 18 are proximal to the top of the inside cover 14. The pair of upper orifices 18 is sized to frictionally engage the lanyard 12. A pair of spaced apart upper orifices 18 is proximal to the top of the outside cover 16. The pair of upper orifices 18 is sized to frictionally engage the lanyard 12.

A pair of spaced apart lower orifices 20 is proximal to the bottom of the inside cover 14. The pair of lower orifices 20 is sized to slidably engage the lanyard 12. A pair of spaced apart lower orifices 20 is proximal to the bottom of the outside cover 16. The pair of lower orifices 20 is sized to slidably engage the lanyard 12. The means for securing the ends of the lanyard 12 on the outer side of the inside cover 14 can be as basic as tying knots in the lanyard 12 ends, or can be various types of cord clips and the like (not shown). By providing for the unfastening of the lanyard's 12 ends, the bags 30 held between the insides of the inside cover 14 and the outside cover 16 can be added to, subtracted from, or replaced. Each bag 30 preferably contains an identification card 40 with identifying information 42. Snelled flies 50 are often identified by name and hook size.

Figure 4:
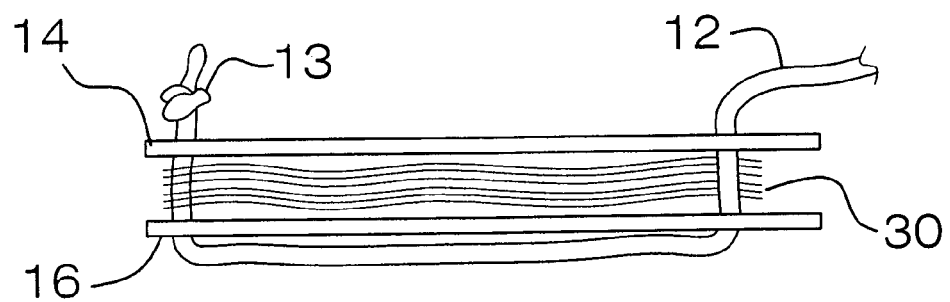
FIG. 4 is a lateral view of the assembled invention, with inside cover on top.

FIG. 4 illustrates knots 13 used to hold the lanyard 12 in place. The passage of the lanyard 12 through the bags 30 secures the bags 30 in position between the inside cover 14 and the outside cover 16.

Referring to FIG. 5, the user 60 has hung the invention 10 around his neck. The lanyard 12 length is adjusted to the user's 60 taste. The outside cover 16 is closed.

Referring to FIG. 6, the user 60 has pivoted the outside cover 16 downward to reveal bags 30. A particular bag 30 is thereby chosen by leafing through those bags 30 held between the inside cover 14 and the outside cover 16. Each bag 30 contains an identification card 40. Card 40 contains information about the corresponding snelled fly, thereby providing for the division and storage of two snelled flies 50 in each bag.

The friction of the lanyard 12 within the upper orifices 18 in the inside cover 14 allows gravity to hold the invention 10 open as desired. Tabs (not shown) can be used to more easily separate and help identify various groups of bags 30 which might contain a particular series or types of flies. Also, various clips (not shown) can be used to mark particular bags 30, such as one might mark a bag 30 which would otherwise contain a snelled fly 50 in use on a fishing line, thereby allowing easier return to the correct bag 30.

FIGS. 5 and 6 fully illustrate the convenience of the invention 10, while providing for instantaneous snelled fly 50 identification and selection. The lugs provide for easily rewinding a snelled fly 50 after use. At the same time, the invention in no way interferes with the travels and activities of the user 60, while providing a tremendous selection that is instantly visible and accessible.

With respect to the above description then, it is to be realized that the optimum dimensional relationships for the parts of the snelled fly file, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A snelled fly file for use by a fisherman, the file comprising:
   a lanyard for suspending the file from a fisherman's neck;
   a parallelepiped inside cover, the inside cover having a top and a bottom, an inner side and an outer side;
   a parallelepiped outside cover, the outside cover having a top and a bottom, an inner side and an outer side;
   a pair of spaced apart upper orifices proximal to the top of the inside cover, the upper orifices proximal to an outer boundary of an each side of the inside cover, the pair of upper orifices sized to frictionally engage the lanyard;
   a pair of spaced apart upper orifices proximal to the top of the outside cover, the upper orifices proximal to an outer boundary of an each side of the inside cover, the pair of upper orifices sized to frictionally engage the lanyard;
   a pair of spaced apart lower orifices proximal to the bottom of the inside cover, the lower orifices having a lesser distance between the pair than the upper orifices, the pair of lower orifices sized to frictionally engage the lanyard;
   a pair of spaced apart lower orifices proximal to the bottom of the outside cover, the lower orifices having a lesser distance between the pair than the upper orifices, the pair of lower orifices sized to frictionally engage the lanyard;
   means for securing the ends of the lanyard on the outer side of the inside cover;
   a plurality of resealable bags secured between the inner sides of the inside cover and the outside cover, each bag for holding snelled flies within, each bag secured between the two covers by the lanyard via a pair of spaced apart bag holes, each bag disposed on an inside of the upper orifices, each pair of bag holes disposed in alignment with the spaced apart lower orifices.

2. The file in claim 1 wherein each bag further comprises at least one identification card for identifying snelled flies within.

3. The file in claim 2 wherein each bag is see-through, the at least one identification card selectively disposed within each bag.

4. A snelled fly file for use by a fly fisherman, the file comprising:
   a lanyard for suspending the file from a fisherman's neck;
   a parallelepiped inside cover, the inside cover having a top and a bottom, an inner side and an outer side;
   a parallelepiped outside cover, the outside cover having a top and a bottom, an inner side and an outer side;
   a pair of spaced apart lugs on at least one cover, the lugs for aiding in coiling a snelled fly;
   a pair of spaced apart upper orifices proximal to the top of the inside cover, the upper orifices proximal to an outer boundary of an each side of the inside cover, the pair of upper orifices sized to frictionally engage the lanyard;
   a pair of spaced apart upper orifices proximal to the top of the outside cover, the upper orifices proximal to an outer boundary of an each side of the inside cover, the pair of upper orifices sized to frictionally engage the lanyard;
   a pair of spaced apart lower orifices proximal to the bottom of the inside cover, the lower orifices having a lesser distance between the pair than the upper orifices, the pair of lower orifices sized to frictionally engage the lanyard;
   a pair of spaced apart lower orifices proximal to the bottom of the outside cover, the lower orifices having a lesser distance between the pair than the upper orifices, the pair of lower orifices sized to frictionally engage the lanyard;
   means for securing the ends of the lanyard on the outer side of the inside cover;
   a plurality of resealable bags secured between the inner sides of the inside cover and the outside cover, each bag for holding snelled flies within, each bag secured between the two covers by the lanyard via a pair of spaced apart bag holes, each bag disposed on an inside of the upper orifices, each pair of bag holes coincidentally disposed in alignment with the spaced apart lower orifices.

5. The file in claim 4 wherein each bag further comprises at least one identification card for identifying snelled flies within.

6. The file in claim 5 wherein each bag is see-through, the at least one identification card selectively disposed within each bag.

* * * * *